April 9, 1946.  H. W. HEYMAN  2,398,002

STRAIN RELIEF MEANS FOR ELECTRICAL CORDS

Filed March 16, 1944

INVENTOR.
HORACE W. HEYMAN
BY
A. D. T. Libby
Attorney

Patented Apr. 9, 1946

2,398,002

UNITED STATES PATENT OFFICE 2,398,002

STRAIN-RELIEF MEANS FOR ELECTRICAL CORDS

Horace W. Heyman, Kenilworth, N. J.

Application March 16, 1944, Serial No. 526,787

5 Claims. (Cl. 173—322)

This invention relates to a strain-relief means for electrical cords or cables that are used for making connections to different pieces of electrical apparatus such as, for example, radio sets, but not limited thereto.

In certain types of structures, the support plate through which the cord or cable passes is relatively thin and the ordinary soft rubber bushing or grommet can get no hold on the support and consequently there is no way of taking up the torque strains or even the push-and-pull strains.

It is therefore the principal object of my invention to provide a strain-relief means which can be used with cords that pass through support plates of varying thicknesses, and to take up all push-pull and torque strains.

In the attached drawing, the different views show devices, which I have made.

Figure 1:
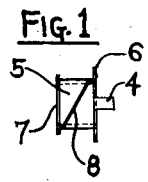
Figure 1 shows one form of device wherein the structure is adapted to be rolled over the conductor, or it may be preformed up to a certain point and then finally pressed into shape over the conductor.
Figure 4:
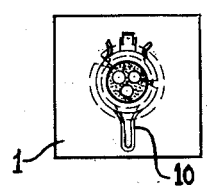
Figure 4 is a rear view of the structure of Figure 1 applied to a cable and mounted in the plate of Figure 2.

Referring now to the details wherein like numbers refer to corresponding parts in the various views, I is a support or mounting plate having an orifice or opening 2 therein. The wall of the opening 2 has a recess 3 to receive a lug 4 formed on the device 5 that is adapted to fit the orifice. In Figure 1 the device 5 is made up of one piece of suitable metal (as are all the other strain devices) formed with flanges 6 and 7 at the ends thereof, and when the piece is rolled up as shown in Figure 1, the meeting edges 8 are at a substantial angle with the plane of the end flanges 6 and 7.

Figure 5:
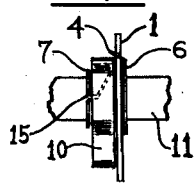
Figure 5 is a side view of the structure of Figure 4.

As this type of structure is squeezed into engagement with the insulation of the cord or cable, the rolling action prevents or reduces to a minimum any cutting effect which the device may have on the insulation of the conductor. It will be noted from Figure 1 that the flange 6 is larger in diameter than the flange 7. This is so that the flange 6 will overlap the orifice 2 in the mounting plate I. A lug 4 formed in the flange 6 is adapted to enter the recess 3 as heretofore referred to, as indicated in Figure 5, to take care of the torque strains on the device. A collar 9 is used with the device of Figure 1 and has a thickness sufficient to take up the space between the body of the device and the peripheral wall of the orifice 2, and a width the same as the thickness of the plate I.

Figure 6:
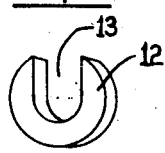
Figure 6 is a view of a modified form of retaining device that may be used in place of the retaining device shown in Figures 4 and 5.
Figure 7:
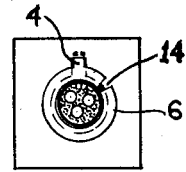
Figure 7 is a view of Figure 5 looking from right to left.

After the cable with the device of Figure 1 attached thereto is inserted through the support plate I, a forked clip 10 of resilient material is slipped over the body of the strain device between the rear flange 7 and the support plate I as illustrated in Figure 5. This locks the strain device and cable II in position to take care of any pull strain to the right, looking at Figure 5; while the flange 6, which is larger in diameter than the orifice 2, prevents a push-strain in the opposite direction. In place of the snap-on device 10, a locking device 12, such as shown in Figure 6, preferably made of fibre, may be used. In this case, the opening 13 has a width such that when it is pushed over the body of the strain device, it acts to further compress the same onto the cable and thereby locks itself into position. It will be noted that the flange 6 is split at 14 and the rear flange 7 is split at 15, thereby allowing the device to be rolled up as heretofore explained.

Figure 2:
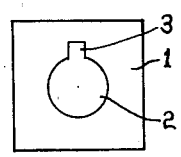
Figure 2 shows a section of a mounting plate for receiving the device of Figure 1.
Figure 3:
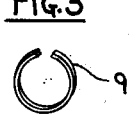
Figure 3 is a spacing collar used in the orifice of Figure 2.
Figure 8:
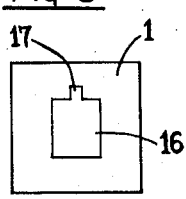
Figure 8 is a view of a section of a mounting plate having an orifice therein to receive a rectangular structure such as shown in Figure 9.
Figure 9:
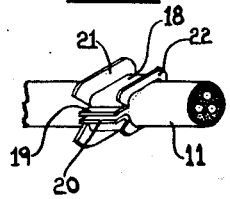
Figure 9 shows a modified form of device applied to a cable and adapted to fit into the plate of Figure 8.
Figure 10:
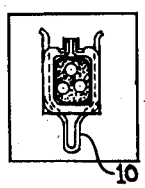
Figure 10 is a view corresponding to Figure 4, but with the structure of Figure 9 applied to the plate.

In Figure 8, the plate 1 is provided with a rectangular-shaped orifice 16 having a recess 17 similar to the recess 3 of Figure 2. This form of orifice is adapted to receive a strain device as illustrated in Figure 9, wherein the body of the device 18 is generally rectangular in shape, the two opposite sides having upturned edges 19 and 20 which, when the device is squeezed onto the cord or cable 11, are adapted to fit in the recess 17 of the plate 1, thereby assisting in taking up the torque strain. Since the device 18 is generally rectangular in shape and the orifice 16 is similarly shaped, certain of the torque strain is taken up by the cooperative action between the orifice 16 and the body 18 of the strain device. The device 18 has a large flange 21 which overlaps the sides of the orifice 16, and a smaller flange 22 that is adapted to pass through the orifice 16, after which the same holding device 10 is slid over the body portion 18 between the flange 22 and the plate 1, thereby locking the device in position and preventing push-and-pull strains on the cable.

Figure 11:
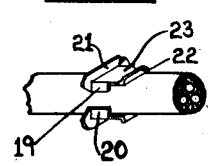
Figure 11 is a slightly modified form of structure from that shown in Figure 9.

In Figure 11, the strain device 23 is somewhat like that shown in Figure 9, with flanges 21 and 22, but in this case the ends 19 and 20 are bent over the insulation for the cable, and the orifice 16 is rectangular in shape, which takes care of the torque strain, it being understood that the push-and-pull strain is taken care of by the snap device 10 or a structure as shown in Figure 6.

Figure 12:
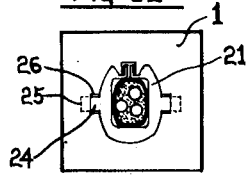
Figure 12 shows a form similar to Figure 9, but a different method of holding the device to the support plate.
Figure 15:
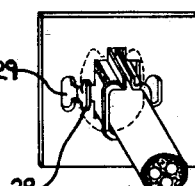
Figure 15 shows a section of the plate with a modified form of orifice therein.

In Figure 12, the strain device structure is the same as that shown in Figure 9, with the exception that the flange 21 has fingers 24 which are adapted to be bent over the rear part of the plate 1 as indicated by the dotted lines 25. In this case, the plate 1, as shown in Figure 15, will have two side recesses 26 in addition to the recess 17 to accommodate the fingers 24.

Figure 13:
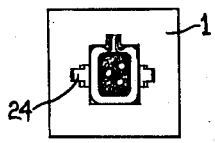
Figure 13 is a rear view of the structure shown in Figure 12.

Figure 13 is a rear view of Figure 12, showing in full lines the lugs 24.

Figure 14:
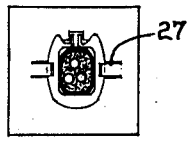
Figure 14 is what might be termed a front view of the same device shown in Figure 12, but with lugs on the mounting plate for engaging the flange on the strain device to hold it in position.

In Figure 14, the plate 1 has lugs 27 that are formed from the plate 1 and then bent over the large flange 21 after the device has been inserted through the orifice 16.

Figure 16:
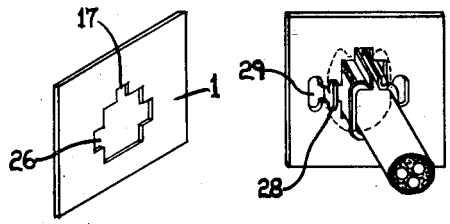
Figure 16 is a rear view of the plate of Figure 15 with a modified form of strain relief device attached to the cable and applied to the plate.
Figure 17:
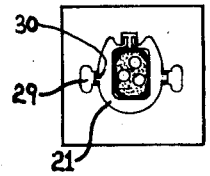
Figure 17 is a front view of Figure 16.

In Figure 16 the device is the same as that shown in Figure 9, with the exception of the holding means to the mounting plate. In this figure, the front flange has oppositely disposed paddle-shaped arms 28 extending therefrom, while the plate 1 has orifices 29 through which the paddle ends 28 will pass when the strain device with the cable is inserted through the plate 1, after which the paddle ends are bent at right angles to the large flange 21 and are positioned in a slot 30 connecting the opening 29 with the opening 16, thereby assisting the upturned ends 19 and 20 to take the torque strain.

To take care of different thicknesses of mounting plates, the holding device 10 may be made in different widths, but to obviate this the device 12 of Figure 6 may be made of a thickness such that a plurality of them may be used to take up the space between the plate 1 and the rear flange 22.

What I claim is:

1. Strain-relief means for an electrical cord comprising, in combination with a plate type support having an orifice therein, a metallic member having a body portion adapted to be swaged around the cord and to pass into said orifice from one end, the body portion having flanges at both ends, the flange at one end being of a size just so it will pass through the orifice without distortion, while the flange at the other end is larger so as to lap over the boundaries of the orifice, the flanges extending around the greater part of the body locking means adapted to be forced over the metallic member between the smaller flange and the support to prevent longitudinal movement of the member in the support in the direction of the larger flange, and means for preventing rotation of the metallic member in the support.

2. Strain-relief means as set forth in claim 1, further defined in that the metallic member, when in clamping position on the cord, is generally rectangular in cross-section, with a split along one side, while said locking means engages the sides coming up to form the split.

3. Strain-relief means as set forth in claim 1, further defined in that the metallic member, when in clamping position on the cord, is generally rectangular in cross-section, with a split along one side, the split being formed by oppositely disposed upturned edges, while the support has a slot therein to receive said edges, the locking means being resiliently engageable with the sides of the metallic member coming up to form the split.

4. Strain-relief means as set forth in claim 1, further defined in that the metallic member is cut and formed with flanges at both ends and so the meeting edges are at a substantial angle with the planes of the end flanges, whereby when the member is squeezed onto the cord, its grip is in a circular direction and cutting of the cord insulation is prevented.

5. Strain-relief means as set forth in claim 1, further defined in that the metallic member is cut and formed with flanges at both ends and so the meeting edges are at a substantial angle with the planes of the end flanges, whereby when the member is squeezed onto the cord, its grip is in a circular direction and cutting of the cord insulation is prevented, and further defined in that the support has a circular orifice of a diameter just sufficient to pass the flange of smaller diameter, a split band ring adapted to fit in the orifice and having a width equal to the thickness of the plate support and a thickness to fill the space between that part of the member between the flanges and the wall of the orifice for the purpose described.

HORACE W. HEYMAN.